US008582206B2

(12) United States Patent
Travis

(10) Patent No.: US 8,582,206 B2
(45) Date of Patent: Nov. 12, 2013

(54) LASER-SCANNING VIRTUAL IMAGE DISPLAY

(75) Inventor: Adrian Travis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 441 days.

(21) Appl. No.: 12/882,994

(22) Filed: Sep. 15, 2010

(65) Prior Publication Data

US 2012/0062850 A1    Mar. 15, 2012

(51) Int. Cl.
  *G02B 5/18* (2006.01)
  *G02B 6/34* (2006.01)
  *G03H 1/00* (2006.01)

(52) U.S. Cl.
  USPC ............... 359/567; 359/13; 359/34; 385/37

(58) Field of Classification Search
  USPC ........ 359/13, 34, 572, 630–633, 567; 385/37; 356/614–624
  See application file for complete search history.

(56) References Cited

U.S. PATENT DOCUMENTS

| 5,406,415 | A | 4/1995 | Kelly |
| 5,999,147 | A | 12/1999 | Teitel |
| 6,046,857 | A | 4/2000 | Morishima |
| 6,232,934 | B1 | 5/2001 | Heacock et al. |
| 6,300,986 | B1 * | 10/2001 | Travis ............................ 349/5 |
| 7,101,048 | B2 | 9/2006 | Travis |
| 2003/0165017 | A1 * | 9/2003 | Amitai ........................ 359/636 |
| 2006/0028400 | A1 | 2/2006 | Lapstun et al. |
| 2006/0238550 | A1 | 10/2006 | Page |

FOREIGN PATENT DOCUMENTS

| CN | 1440513 A | 9/2003 |
| JP | 10301055 A | 11/1998 |
| JP | 2001174746 A | 6/2001 |
| JP | 2009122551 A | 6/2009 |

OTHER PUBLICATIONS

Travis et al., Flat Projection for 3-D, Proc. of the IEEE, vol. 94, No. 3, pp. 539-549 (Mar. 2006).*
Zhang, Rui, "Design of Head mounted displays", Retrieved at <<http://www.optics.arizona.edu/optomech/student%20reports/2007/Design%20%20head%20mounteddisplays%20Zhang.pdf >>, Dec. 12, 2007, pp. 6.

(Continued)

*Primary Examiner* — Stephone Allen
*Assistant Examiner* — Kimberly N Kakalec
(74) *Attorney, Agent, or Firm* — Allenman Hall McCoy Russel & Tuttle LLP

(57) ABSTRACT

A virtual-image projector comprises a laser configured to form a narrow beam, first and second dilation optics, first and second redirection optics each having a diffraction grating, and a controller. The first dilation optic is arranged to receive the narrow beam and to project a one-dimensionally dilated beam into the second dilation optic. The second dilation optic is arranged to receive the one-dimensionally dilated beam and project a two-dimensionally dilated beam. The first and second redirection optics are each operatively coupled to a transducer. The first redirection optic is arranged to direct the narrow beam into the first dilation optic at a first entry angle. The second redirection optic is configured to direct the one-dimensionally dilated beam into the second dilation optic at a second entry angle. The controller is configured to bias the transducers to vary the first and second entry angles.

19 Claims, 5 Drawing Sheets

(56) References Cited

OTHER PUBLICATIONS

Peli, Eli, "Design of a polarized head-mounted projection display using FLCOS microdisplays", Retrieved<<http://www.u.arizona.edu/~zrui3/zhang_pHMPD_spie07.pdf>>, The Society for Imaging Science and Technology, 1996, pp. 364-369.

"International Search Report", Mailed Date: Apr. 9, 2012, Application No. PCT/US2011/050471, Filed Date: Sep. 6, 2011, pp. 8.

Travis, A. et al., "Flat Projection for 3-D", Proceedings of the IEEE, Vole. 94, No. 3, Mar. 2006, 11 pages.

* cited by examiner

LASER-SCANNING VIRTUAL IMAGE DISPLAY

BACKGROUND

A compact display system may be coupled into goggles, a helmet, or other eyewear. These configurations enable the wearer to view images from a computer, media player, or other electronic device with privacy and mobility. When adapted to display two different images concurrently—one for each eye—the system may be used for stereoscopic display (e.g., virtual-reality) applications.

As the human eye cannot focus on images less than a few centimeters away, a compact display system may be configured to provide the display image as a virtual image—e.g., an image formed in a focal plane located more than a few centimeters from the eye. One challenge in this field is to form such an image using a compact, robust optical arrangement, which also provides suitable image resolution and fidelity.

SUMMARY

One embodiment of this disclosure provides a virtual-image projector. The projector comprises a laser configured to form a narrow beam, first and second dilation optics, first and second redirection optics, and a controller. The first and second dilation optics each have a diffraction grating. The first dilation optic is arranged to receive the narrow beam and to project a one-dimensionally dilated beam into the second dilation optic. The second dilation optic is arranged to receive the one-dimensionally dilated beam and to project a two-dimensionally dilated beam, which provides the virtual image. The first and second redirection optics are each operatively coupled to a transducer. The first redirection optic is arranged to direct the narrow beam into the first dilation optic at a first entry angle. The second redirection optic is configured to direct the one-dimensionally dilated beam into the second dilation optic at a second entry angle. The controller is configured to bias the transducers to vary the first and second entry angles.

The summary above is provided to introduce in simplified form a selected part of this disclosure, which is further described hereinafter. It is not meant to identify key or essential features of the claimed subject matter. Rather, the claimed subject matter is defined only by the claims and is not limited to implementations that solve any disadvantages noted herein.

DETAILED DESCRIPTION

Figure 2:
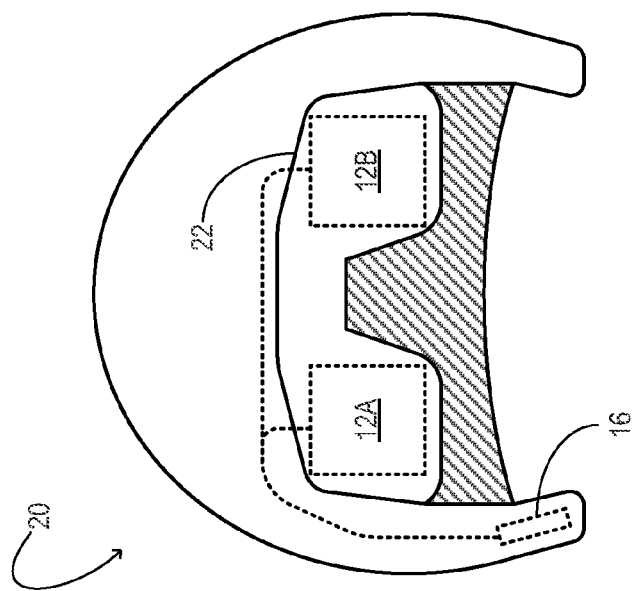
FIGS. 1 and 2 show example head-mounted display devices in accordance with embodiments of this disclosure.

The subject matter of this disclosure is now described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

Figure 1:
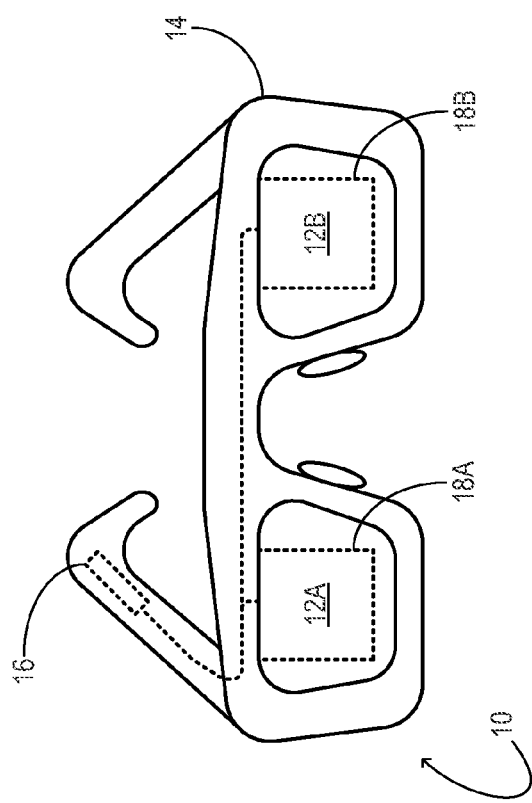

FIG. 1 shows an example head-mounted display device 10 in one embodiment. Device 10 is an example of video-display eyewear. It may closely resemble an ordinary pair of eyeglasses or sunglasses. However, this device includes projectors 12A and 12B, which project virtual display images for view by a wearer. More particularly, the virtual display images are projected directly in front of the wearer's eyes. To this end, device 10 includes wearable mount 14 configured to position the projectors a short distance in front of the wearer's eyes, as further described hereinafter. In the illustrated embodiment, the wearable mount takes the form of conventional eyeglass frames. In one embodiment, each projector may project a 16:9 aspect ratio image that will appear to the wearer as if it were 21 inches in diagonal and viewed at arm's length. Device 10 also includes controller 16, which controls the internal componentry of the projectors in order to form the virtual display images, as further described hereinafter.

In one embodiment, projectors 12A and 12B may project virtual display images of infinitely distant objects, where the lens of the human eye adjusts to an infinite or near-infinite focal length to focus on such objects. Further, the projectors may be at least partly transparent, so that the wearer can see external objects as well as the virtual display images. In the embodiment shown in FIG. 1, device 10 includes lenses 18A and 18B arranged in front of the projectors. The lenses may be configured to correct the focus and/or brightness of the external objects for the comfort and vision needs of the wearer. This arrangement may allow the wearer to shift his or her focus between the external objects, a finite distance away, and virtual display images an infinite distance away.

In one embodiment, controller 16 may cause projectors 12A and 12B to project the same virtual display image concurrently, so that the wearer's right and left eyes receive the same image at the same time. In another embodiment, the projectors may project slightly different images concurrently, so that the wearer perceives a stereoscopic, i.e., three-dimensional image.

FIG. 2 shows another example head-mounted display device 20 in one embodiment. Device 20 is a helmet having a display visor 22, behind which projectors 12A and 12B are arranged. Device 20 may be used in applications ranging from video gaming to aviation.

Figure 3:
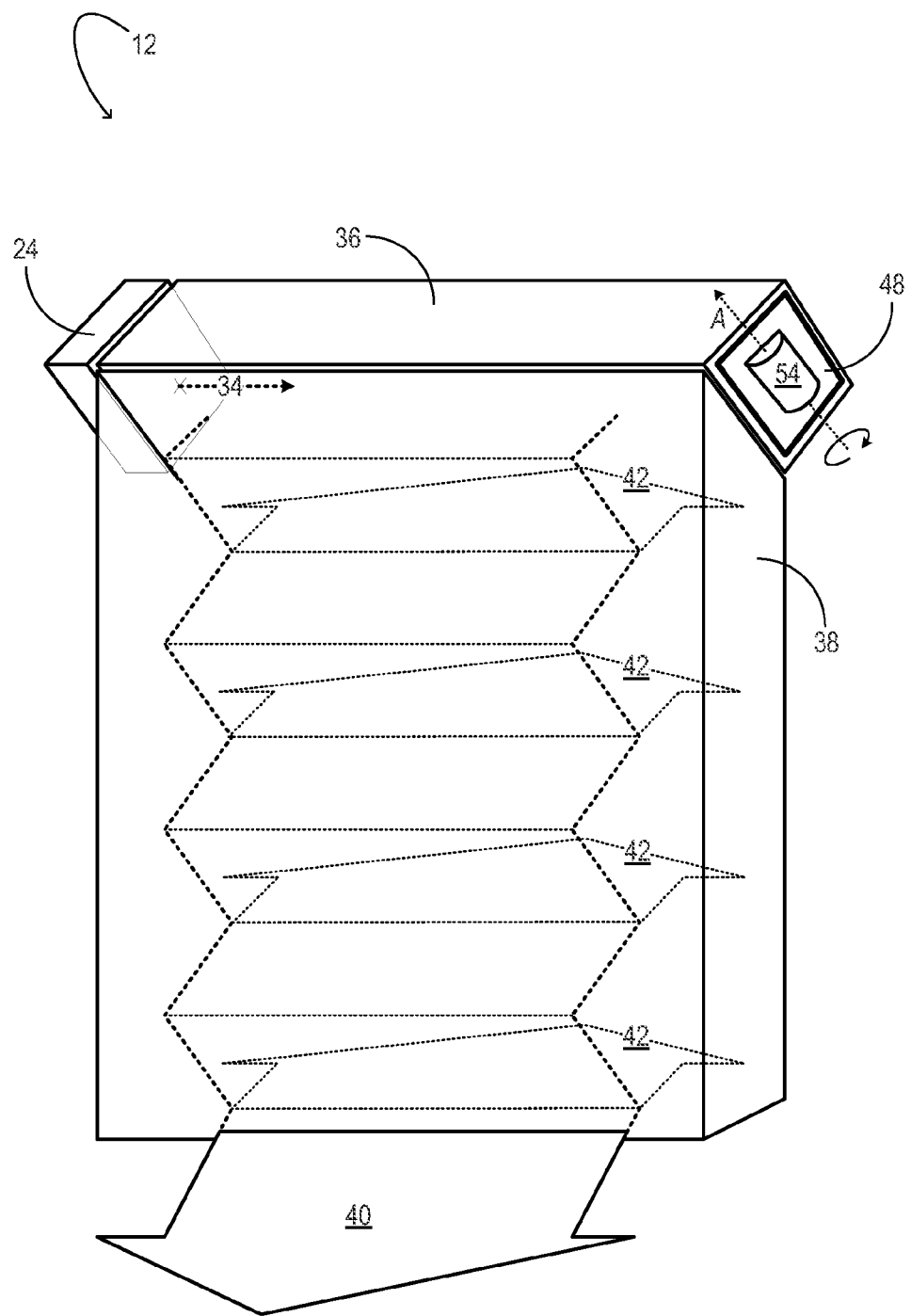
FIG. 3 shows aspects of an example projector in accordance with an embodiment of this disclosure.
Figure 4:
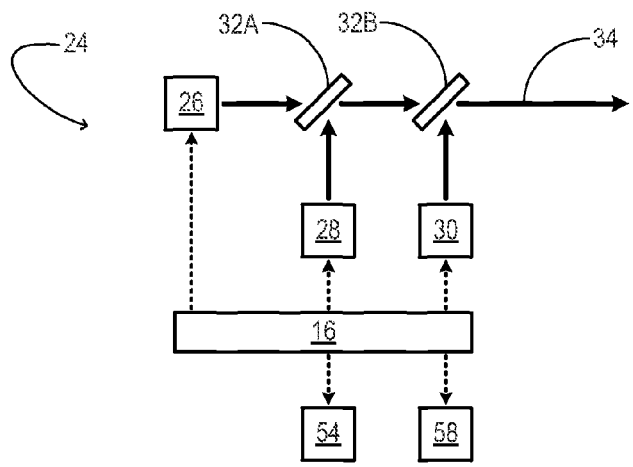
FIG. 4 shows aspects of an example illuminator in accordance with an embodiment of this disclosure.

FIG. 3 shows aspects of an example projector 12 in one embodiment. The projector includes illuminator 24, shown schematically in FIG. 4. Coupled in the illuminator are red laser 26, green laser 28, and blue laser 30. The red, green, and blue lasers may be semiconductor lasers—low-power diode lasers, for example, or any other suitable lasers. In the embodiment illustrated in FIG. 4, the red, green, and blue lasers are independently biased and modulated via controller 16. Illuminator 24 includes merging optics 32A and 32B—waveguides or partially silvered mirrors, for example. The merging optics are arranged to merge the monochromatic emission from each of the lasers to form narrow beam 34. In this disclosure, a 'beam' is any form of collimated radiation—neither convergent nor divergent within practical limits. A 'narrow beam' is a beam having a point-like cross-section, again within practical limits. In one embodiment, illuminator 24 may be configured to form a narrow beam 1.0 millimeters (mm) or less in cross section. The divergence of the beam may be approximately one wavelength divided by the beam diameter—e.g., for green light with a beam diameter of 1.0 mm, the divergence may be 0.5/1000 radians, or 0.03 degrees.

A display image may be formed by sweeping a laser beam over a two-dimensional area while modulating the beam to illuminate selected points in the area. When the area includes a reflective or scattering surface at an appropriate depth for focusing, a direct display image may be formed on the surface. Alternatively, a virtual display image may be formed, even when no such surface is available. The virtual display image may be constructed, for instance, so that light from a given locus of the image travels in parallel rays through an observer's pupil. When brought into focus, this image appears to the observer to be that of a far-away object. In principle, narrow beam 34 could be used directly to form such an image. However, that would entail focusing a relatively intense laser emission on relatively few receptors in the observer's eye. By contrast, the systems and devices described herein use dilation optics to expand the narrow beam so that it fills or overfills the observer's pupil, while preserving the collimated orientation of the beam.

In one embodiment, with reference to FIG. 3, projector 12 includes first dilation optic 36 and second dilation optic 38. The first dilation optic is arranged to receive narrow beam 34 and to project a one-dimensionally dilated beam 40 into the second dilation optic. The second dilation optic is arranged to receive the one-dimensionally dilated beam and to project a two-dimensionally dilated beam 42, from which a virtual display image is formed. In the illustrated embodiment, the first and second dilation optics are polyhedral waveguides that transmit light by total internal reflection (TIR). In one embodiment, the first dilation optic may be 40 mm in length, 1.4 mm in height, and 1.7 mm in depth; the second dilation optic may be 40 mm in length, 40 mm in height, and 1.2 mm in depth. Naturally, this disclosure embraces other dimensions and ranges of dimensions besides those explicitly recited. The first and second dilation optics may comprise glass, acrylic, or polycarbonate monoliths, for example, while other suitably transparent structures are contemplated as well. In one embodiment, the first and second dilation optics may be coupled mechanically to wearable mount 14. The wearable mount may be configured to position the second dilation optic a short distance in front of one eye of the wearer.

Figure 5:
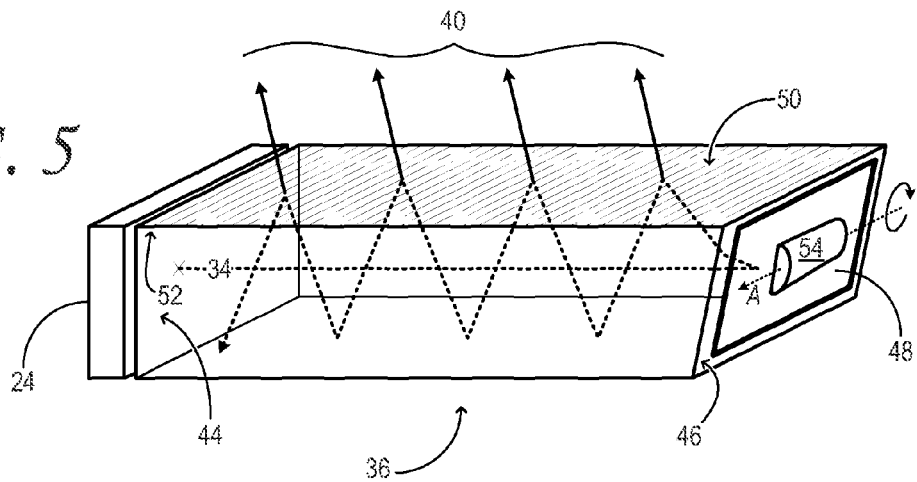
FIGS. 5, 6, and 7 show aspects of an example projector in accordance with an embodiment of this disclosure.

FIG. 5 shows first dilation optic 36 in greater detail. In the illustrated embodiment, end face 44 of the first dilation optic is positioned adjacent illuminator 24 and arranged to receive narrow beam 34 from the illuminator. The narrow beam passes directly through the first dilation optic to opposite end face 46; there it encounters first redirection optic 48.

Comprising a mirror or a beam-turning refractive structure, first redirection optic 48 reflects narrow beam 34 back into first dilation optic 36 at an angle greater than the critical angle for TIR. End face 46 of the first dilation optic, arranged opposite the first redirection optic, is therefore the entry face of the optic; the entry face is oblique, to increase the incidence angle of the reflected narrow beam relative to the critical angle. In one embodiment, the first redirection optic comprises a 1.1 by 1.0 mm plane mirror.

Inside first dilation optic 36, reflected narrow beam 34 propagates away from the entry face by TIR. However, the TIR condition is partially frustrated by diffraction grating 50. The reflected narrow beam interacts with the diffraction grating at numerous TIR points along the length of the first redirection optic. At each reflection, some light is diffracted out from the optic and into the air space above it, forming one-dimensionally dilated beam 40—viz., a beam dilated in the length direction of the optic. The face from which the one-dimensionally dilated beam first emerges from the first dilation optic is the exit face 52 of the optic. In the various embodiments here contemplated, the diffraction grating may be embossed, transferred, or otherwise formed on the exit face. In other embodiments, the diffraction grating may be formed on a different face of the optic—on the face opposite the exit face, for example. In still other embodiments, the diffraction grating may be formed within the waveguide on a plane parallel to the exit face, or even as a volume hologram.

Diffraction grating 50 may be relatively weak, such that narrow beam 34 retains most of its intensity as it propagates through first dilation optic 36. As a result, one-dimensionally dilated beam 40 may have a nearly constant intensity along the length of the optic. In embodiments where even tighter control of the intensity is desired, or where the diffraction grating is made stronger to increase optical efficiency, diffraction grating 50 may be configured so that the yield of diffracted light relative to propagated light increases with distance along the optic. In this manner, the loss of intensity in the propagating narrow beam may be compensated. In one embodiment, a suitable grating characteristic may be increased or decreased with distance along the optic to secure this effect.

In any virtual image, the apparent X, Y position of a locus of the image is determined by the direction in which light rays from that locus enter the eye. The direction may be defined in terms of any two non-coplanar angles. Therefore, to illuminate a particular locus of a virtual image using a beam, control of the beam orientation along two non-coplanar angles is required. To this end, first redirection optic 48 is pivotally mounted and coupled to transducer 54, which is configured to pivot the optic. The first redirection optic is thus arranged to direct narrow beam 34 into the first dilation optic at a first entry angle—i.e., the angle of incidence measured normal to the entry face of the optic. In addition, projector 12 includes a second redirection optic 56 (eclipsed from view in FIGS. 3 and 5, but shown in FIG. 6). The second redirection optic, like the first, is also pivotally mounted and is coupled to a transducer 58. As further described hereinafter, the second redirection optic is configured to direct one-dimensionally dilated beam 40 into the second dilation optic at a second entry angle.

'Transducer' is a term applied herein to any device that brings about a physical change in response to an electrical signal. In one, non-limiting example, a transducer may impart a translational or torsional force to an optic commensurate with a voltage or current applied to it. In another example, a transducer may effect a change in an optical property of the optic commensurate with the voltage or current applied to it. Accordingly, transducers 54 and 58 may each comprise a piezoelectric, electrostatic, or electromagnetic electromotive element, for example. In one embodiment, the electromotive element of transducer 54 may be the same or similar to that of transducer 58. In other embodiments, the electromotive elements of these transducers may be different, as the contemplated ranges and frequencies of motion may differ for first redirection optic 48 and second redirection optic 56 (vide infra).

Returning now to FIG. 4, controller 16 is configured to bias transducer 54 of first redirection optic 48 to vary the first entry angle. The controller is also configured to bias transducer 58 of second redirection optic 56 to vary the second entry angle. Further, the controller is configured to modulate the intensities of lasers 26, 28, and 30 in synchronicity with the first and second entry angles to form a virtual display image visible through the second dilation optic.

FIG. 5 shows first redirection optic 48 coupled to transducer 54. The transducer is configured to pivot the first redirection optic about the axis marked A in the drawings. This action controls the first entry angle, where narrow beam 34 enters the first dilation optic. In the illustrated embodiment, the A axis is aligned parallel to the entry face of the first dilation optic. In one embodiment, transducer 54 is configured to pivot first redirection optic 48 over a range of 26 degrees—e.g., between −3 and 23 degrees relative to exit face 52. According to known principles of geometric optics, the orientation of the exiting, one-dimensionally dilated beam 40 is related to the first entry angle, to the wavelength, and to the scratch orientation of diffraction grating 50 relative to the propagation plane of the narrow beam. In one embodiment, the diffraction grating of the first dilation optic may be scratched normal to the propagation plane of the narrow beam, and parallel to the axis marked A in the drawings.

Figure 6:
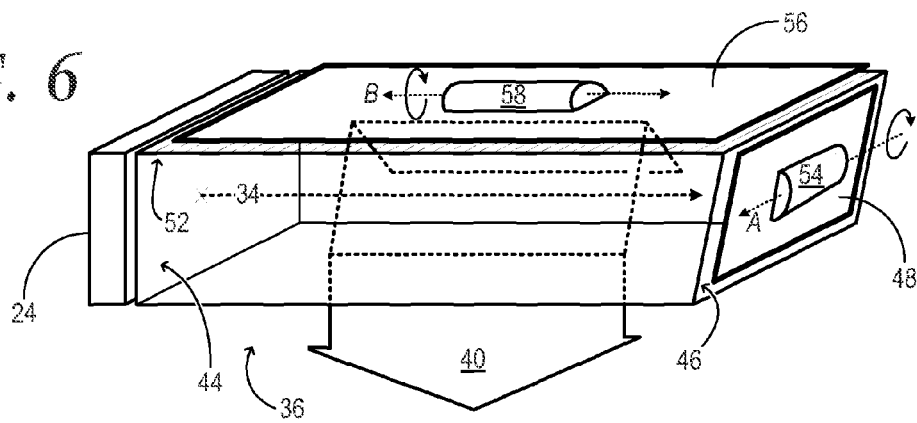

FIG. 6 shows another view of first dilation optic 36, with second redirection optic 56 installed. Like first redirection optic 48, the second redirection optic may also comprise a mirror or a beam-turning refractive structure. In one embodiment, the second redirection optic comprises a 1.1 by 40 mm plane mirror. The second redirection optic is arranged opposite exit face 52 of the first dilation optic. In this configuration, one-dimensionally dilated beam 40 is reflected back through the exit face of the first dilation optic after reflecting from the second redirection optic. It is then transmitted back through the first dilation optic en route to second dilation optic 38.

Figure 7:
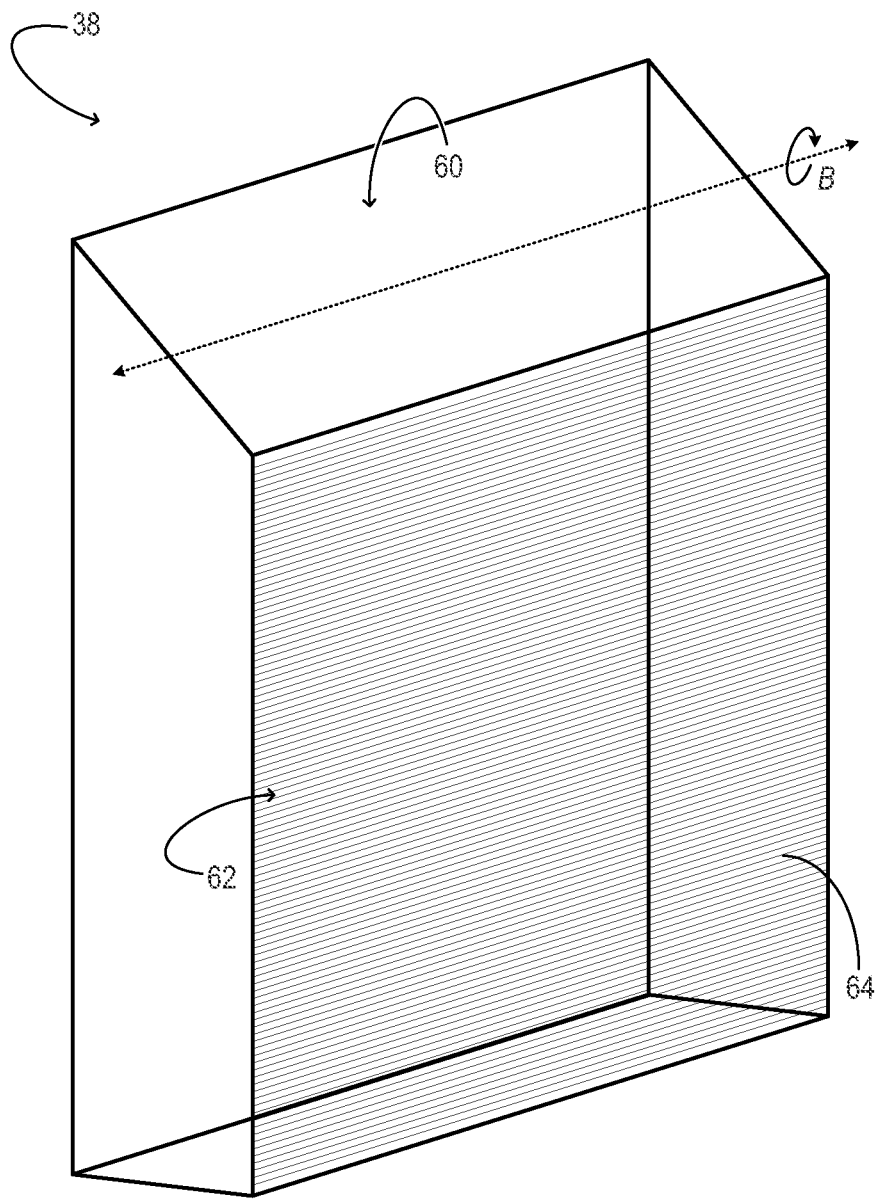

Returning now to FIG. 3, transducer 58 is coupled to the second redirection optic and configured to pivot the second redirection optic about the axis marked B in the drawings. This action controls the second entry angle, where one-dimensionally dilated beam 40 enters the second dilation optic. FIG. 7 shows the second redirection optic isolated for clarity and rotated with respect to its orientation in FIG. 3. In the illustrated embodiment, the B axis is aligned parallel to exit face 52 of first dilation optic 36 and parallel to entry face 60 of the second dilation optic. In one embodiment, transducer 58 is configured to pivot second redirection optic 56 over a range of 11 degrees—e.g., 1 to 12 degrees relative to the plane of illumination.

Exit face 62 of second dilation optic 38 is the face from which two-dimensionally dilated beam 42 emerges from the optic. In the illustrated embodiment, this exit face supports diffraction grating 64. In one embodiment, the diffraction grating of the second dilation optic may be scratched parallel to the B axis.

Returning now to FIG. 6, the second redirection optic may be larger and configured to pivot slower than the first redirection optic. In one embodiment, the second redirection optic may be pivoted at a rate of fifty to sixty Hertz to scan through the horizontal rows of a virtual display image, while the first redirection optic is pivoted faster, to scan through the vertical columns of the display image for each row.

The configurations described above enable various methods for projecting a virtual display image. Some such methods are now described, by way of example, with continued reference to the above configurations. It will be understood, however, that the methods here described, and others fully within the scope of this disclosure, may be enabled via other configurations as well.

Figure 8:
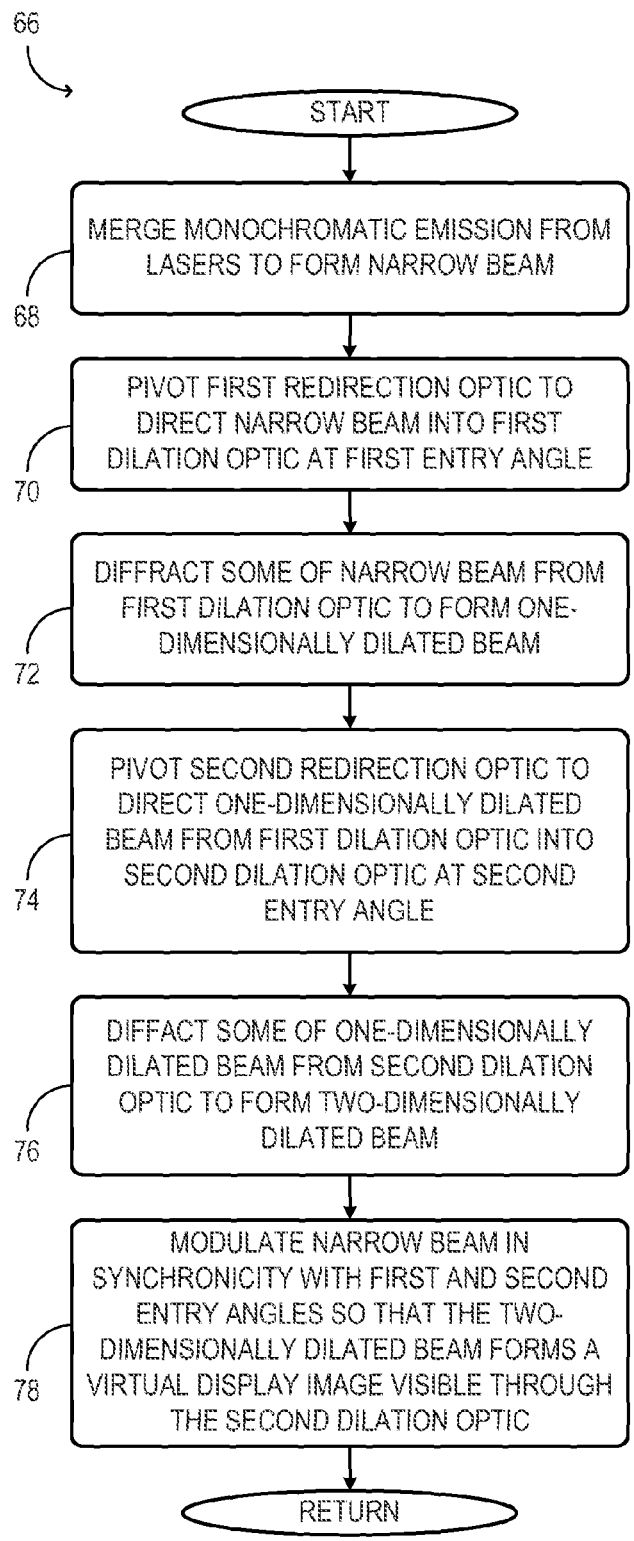
FIG. 8 illustrates an example method for projecting a virtual display image in accordance with an embodiment of this disclosure.

FIG. 8 shows an example method 66 for projecting a virtual display image. At 68, monochromatic emission from a plurality of lasers is merged to form a narrow beam. At 70 a first redirection optic is pivoted to direct the narrow beam into a first dilation optic at a first entry angle. At 72 some of the narrow beam from the first dilation optic is diffracted out of the optic to form a one-dimensionally dilated beam. At 74 a second redirection optic is pivoted to direct the one-dimensionally dilated beam from the first dilation optic into the second dilation optic at a second entry angle. At 76 some of the one-dimensionally dilated beam from the second dilation optic is diffracted out of the optic to form a two-dimensionally dilated beam. At 78 the narrow beam is modulated in synchronicity with the first and second entry angles so that the two-dimensionally dilated beam forms a virtual display image visible through the second dilation optic. From 78 the method returns.

In one embodiment, diffracting some of the narrow and one-dimensionally dilated beams comprises transmitting the beams through waveguide portions of the first and second dilation optics via total internal reflection, and, frustrating the total internal reflection via weak diffraction gratings arranged on the waveguide portions. Further, modulating the narrow beam may comprise applying a modulation to each of a plurality of lasers according to a phase mapping that differs for each laser. This is so because the angle at which light is diffracted out of the waveguide portions of the first and second dilation optics is strongly dependent on wavelength.

No aspect of FIG. 8 is intended to be limiting. For example, other embodiments are contemplated in which first and second redirection optics may be biased via a transducer to vary the first and second entry angles without physically pivoting about an axis. In one embodiment, the redirection optics may themselves be static, but may exhibit an optical property subject to control by a transducer. By controlling the optical property, the angles at which the narrow and/or one-dimensionally dilated beams enter the first and second dilation optics may be actively controlled.

From the foregoing description, it will be evident that certain other configurations may be used to project a virtual display image, by rearranging and reconfiguring the various optical components. In some cases, the illustrated embodiments offer advantages over some alternative configurations. For instance, it is possible to direct light from a first redirection optic directly into a second redirection optic, and then into a dilation optic. However, this alternative configuration may require much tighter dimensional and smoothness tolerances on the waveguide portion of the dilation optic than do the illustrated embodiments. This is because the rays of the laser beam would start fanning out as soon as they leave the first redirection optic. By the time these rays have reflected off the second redirection optic, the initially narrow beam is now greatly increased in cross section. This condition could result in an inconveniently large dilation optic to capture the light efficiently. Further, as the rays continue fanning out as they enter the dilation optic, resolution would be lost unless the rays are accepted at perfect right-angles to the surfaces of the optic.

In contrast, the configurations described herein guide the beam through the sequence: redirection optic, dilation optic, redirection optic, dilation optic. Accordingly, after bouncing off the first redirection optic, the narrow beam has little chance to fan out because it is promptly confined by the waveguide portion of the first dilation optic. Furthermore, it does not encounter the sides of the first dilation optic, so the dimensional and smoothness tolerances of this optic are greatly relaxed. While the second redirection optic is obliged to be relatively long in the configurations described above, this is not a serious limitation, as it need only oscillate on the order of one-hundred Hertz to provide adequately fast scanning in the vertical direction.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A virtual-image projector comprising:
   a laser configured to form a narrow beam;
   first and second dilation optics, each one having a diffraction grating, the first dilation optic arranged to receive the narrow beam and to project a one-dimensionally dilated beam into the second dilation optic, the second dilation optic arranged to receive the one-dimensionally dilated beam and to project a two-dimensionally dilated beam;
   first and second redirection optics, each one operatively coupled to a transducer configured to pivot the redirection optic to which it is coupled, the first redirection optic arranged to direct the narrow beam into the first dilation optic at a first entry angle, the second redirection optic configured to direct the one-dimensionally dilated beam into the second dilation optic at a second entry angle; and
   a controller configured to bias the transducers to vary the first and second entry angles by pivoting the first and second redirection optics, and further configured to modulate an intensity of the laser in synchronicity with the first and second entry angles such that a virtual display image is formed and made visible through the second dilation optic.

2. The projector of claim 1, wherein the laser is among a plurality of lasers, and wherein the projector further comprises one or more merging optics arranged to merge monochromatic emission from the lasers to form the narrow beam.

3. The projector of claim 1, wherein the first and second dilation optics are polyhedral waveguides that transmit light by total internal reflection.

4. The projector of claim 3, wherein the diffraction gratings of the first or second dilation optics are configured so that the yield of diffracted light relative to reflected light increases with distance transmitted across the optic.

5. The projector of claim 1, wherein the first dilation optic includes an entry face through which the narrow beam is directed into the first dilation optic and an exit face from which the one-dimensionally dilated beam exits the first dilation optic.

6. The projector of claim 5, wherein the first and second redirection optics are each pivotally mounted and coupled to a transducer, wherein the first redirection optic is arranged opposite the entry face and pivots on an axis parallel to the entry face, and wherein the second redirection optic is arranged opposite the exit face and pivots on an axis parallel to the exit face.

7. The projector of claim 5, wherein the narrow beam is transmitted through the first dilation optic and exits the entry face before reflecting back into the entry face from the first redirection optic.

8. The projector of claim 5, wherein the one-dimensionally dilated beam is reflected back through the exit face after reflecting from the second redirection optic, and is transmitted back through the first dilation optic en route to the second dilation optic.

9. The projector of claim 5, wherein the exit face supports the diffraction grating of the first dilation optic.

10. The projector of claim 1, wherein the second dilation optic includes an entry face through which the one-dimensionally dilated beam is directed into the second dilation optic and an exit face from which the two-dimensionally dilated beam exits the second dilation optic, and wherein the exit face supports the diffraction grating of the second dilation optic.

11. The projector of claim 1, wherein the first or second redirection optic comprises a mirror.

12. The projector of claim 1, wherein the first redirection optic is smaller and configured to pivot faster than the second redirection optic.

13. The projector of claim 1, wherein the first and second redirection optics pivot, respectively, on first and second axes, wherein the diffraction grating of the first dilation optic is scratched parallel to the first axis, and wherein the diffraction grating of the second dilation optic is scratched parallel to the second axis.

14. A method for projecting a virtual display image, the method comprising:
   biasing a first redirection optic to direct a narrow beam into a first dilation optic at a first entry angle;
   diffracting some of the narrow beam from the first dilation optic to form a one-dimensionally dilated beam;
   pivoting a second redirection optic to direct the one-dimensionally dilated beam from the first dilation optic into a second dilation optic at a second entry angle;
   diffracting some of the one-dimensionally dilated beam from the second dilation optic to form a two-dimensionally dilated beam; and
   modulating the narrow beam in synchronicity with the first and second entry angles so that the two-dimensionally dilated beam forms a virtual display image visible through the second dilation optic.

15. The method of claim 14, wherein diffracting some of the narrow and one-dimensionally dilated beams comprises:
   transmitting the beams through waveguide portions of the first and second dilation optics via total internal reflection; and
   frustrating the total internal reflection via weak diffraction gratings arranged on the waveguide portions.

16. The method of claim 14 further comprising merging monochromatic emission from a plurality of lasers to form the narrow beam.

17. The method of claim 16, wherein modulating the narrow beam comprises applying a modulation to each of a plurality of lasers according to a phase mapping that differs for each laser.

18. A head-mounted display device for displaying a virtual display image for view by a wearer, the device comprising:
   a laser configured to form a narrow beam;
   first and second dilation optics, each one having a diffraction grating, the first dilation optic arranged to receive the narrow beam and to project a one-dimensionally dilated beam into the second dilation optic, the second dilation optic arranged to receive the one-dimensionally dilated beam and to project a two-dimensionally dilated beam;

first and second redirection optics, each one pivotally mounted and coupled to a transducer configured to pivot the optic, the first redirection optic arranged to direct the narrow beam into the first dilation optic at a first entry angle, the second redirection optic configured to direct the one-dimensionally dilated beam into the second dilation optic at a second entry angle;

a controller configured to bias the transducers to vary the first and second entry angles by pivoting the first and second redirection optics, and further configured to modulate an intensity of the laser in synchronicity with the first and second entry angles such that the virtual display image is formed and made visible through the second dilation optic; and a wearable mount configured to position the second dilation optic a short distance in front of one eye of the wearer.

19. The device of claim 18, wherein the laser, the dilation optics, and the redirection optics are coupled in a first projector configured to provide the virtual display image to a first eye of the wearer;

wherein the device comprises a second projector configured to provide a virtual display image to a second eye of the wearer.

* * * * *